United States Patent [19]

Bapat

[11] Patent Number: 4,916,610
[45] Date of Patent: Apr. 10, 1990

[54] MULTILANGUAGE SOFTWARE INTEGRATION THROUGH PREPROCESSING

[75] Inventor: Subodh Bapat, Fort Lauderdale, Fla.

[73] Assignee: Racal Data Communications Inc., Sunrise, Fla.

[21] Appl. No.: 253,464

[22] Filed: Oct. 5, 1988

[51] Int. Cl.$^4$ .............................................. G06F 9/00
[52] U.S. Cl. ................................................. 364/300
[58] Field of Search ........................ 364/200, 300, 900

[56] References Cited

U.S. PATENT DOCUMENTS

| | | | |
|---|---|---|---|
| 4,309,756 | 1/1982 | Beckler | 364/300 |
| 4,315,315 | 2/1982 | Kossiakoff | 364/300 |
| 4,330,822 | 5/1982 | Dodson | 364/200 |
| 4,374,408 | 2/1983 | Bowles et al. | 364/300 |
| 4,414,629 | 11/1983 | Waite | 364/300 |
| 4,463,423 | 7/1984 | Potash et al. | 364/300 |
| 4,559,614 | 12/1985 | Peek et al. | 364/900 |
| 4,566,078 | 1/1986 | Crabtree | 364/900 |
| 4,567,574 | 1/1986 | Saade et al. | 364/900 |
| 4,595,981 | 6/1986 | Leung | 364/300 |
| 4,692,896 | 9/1987 | Sakoda et al. | 364/900 |
| 4,719,564 | 1/1988 | Hara | 364/200 |

OTHER PUBLICATIONS

*Advanced Turbo Pascal Programming & Techniques,* Herbert Schildt, 1986, McGraw Hill, pp. 108–124.
*CTIX Operating System Manual,* Convergent Technologies, date unknown, pp. 1–2.
*The C Programming Language,* Brian W. Kerninghan and Dennis M. Ritchie, 1978, Prentice-Hall, Inc., pp. 86–87 and 207–208.

*Primary Examiner*—Raulfe B. Zache
*Attorney, Agent, or Firm*—Jerry A. Miller

[57] ABSTRACT

A method of assuring consistency of constants in a multilanguage software system, includes generating a first set of code written in a first language using a plurality of symbolic constants to represent a corresponding plurality of actual constants. A second set of code is written in a second language using the plurality of symbolic constants to represent the corresponding plurality of actual constants. A common header file is generated which contains information which relates the plurality of symbolic constants to the corresponding plurality of actual constants. The header is included within the first and second sets of code. The symbolic constants in the first and second sets of code are replaced with their corresponding actual constants during a preprocessing step. Any constructs which are not a part of the first language are stripped from the second set of code including the header file. Any constructs which are not a part of the second language are stripped from the first set of code including the header. The resulting files have their symbolic constants consistently replaced by constants which are defined in the header so that changes need only be made in the header file to assure consistency in the several languages.

11 Claims, 1 Drawing Sheet

MULTILANGUAGE SOFTWARE INTEGRATION THROUGH PREPROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

This invention relates generally to the field of software development using multiple languages and more particularly to a preprocessing technique for assuring consistency of global constants in a multilanguage environment.

2. Background of the Invention

Many large software development projects require that their systems product be generated from many different types of source files. On some occasions large software system could be generated through the use of multiple languages. There are various reasons why a single source language might not be sufficient for the generation and maintenance of software systems. For example, the system could be interfacing with another system supplied by an external vendor, and the interface definition could possibly be in a different language than the "native" language of the software system. Or, certain parts of the system could be written in a faster, lower-level language (such as assembly) than other parts.

This in itself is not a problem as long as the necessary tools are available to do the interpretation. Typically, this involves the use of several different compilers, interpreters, and assemblers, each of which interprets a specific source language, and together create the system such that it is executable on the operational platforms.

However, the problem lies at a more fundamental level, that is, in situations where it is desired that there be communication between the source files themselves or common use of constants by several files using different software languages. This is evident in situations where it is necessary to define certain global system parameters prior to system generation time, in a manner that the parameters be available to source files of all languages. While every source language today has the ability to pass a parameter definition from a single place down to all instances of usage of that parameter, this parameter knowledge mechanism is always specific to the language itself. No such mechanism currently exists for providing this parameter knowledge across software language barriers.

In order to be able to set a global compile time parameter in a system to be generated from multiple source languages, therefore, one typically has to make multiple difinitions for that parameter, each one using the parameter knowledge mechanism for a specific source language. This leads to very inefficient software maintenance, for when that parameter is changed, it must be changed in all the places where it is defined. If perchance the parameter is changed in one place and not another, the consequences to the generated system can be disastrous and can be very difficult to detect. Since large software systems are typically generated with several thousand compile time parameters, the problem of maintaining these in a multilanguage environment assumes enormous proportions.

As as simple example of the above problem, consider two source files, one written in BASIC and one written in PASCAL, and assume that these two files are part of a large software system. Assume further that each of these files utilize a number of common constants including a constant called CONST1 in each file. This constant CONST1 might represent, for example, a maximum limit on a variable TEMP (temperature). Tables 1 and 2 show the example BASIC and PASCAL code respectively.

TABLE 1

```
10      REM     PROGRAM TO MONITOR PROCESS
    .
    .
100             LET CONST1 = 657
    .
    .
1700            IF TEMP > CONST1 THEN GO TO 2000
    .
    .
2000            PRINT "WARNING - TEMPERATURE LIMIT
                EXCEEDED"
2001            PRINT "CURRENT BATCH DAMAGED.
                INITIALIZE PROCESS"
2002            END
```

TABLE 2

```
Program Process_Control;
     Const    Const1 = 675;   {absolute maximum temp.}
              Const2 = 660;   {ideal maximum temp.}
              Const3 = 650;   {ideal minimum temp.}
              Const4 = 635;   {absolute minimum temp.}
     .
     .
Procedure Control_Oven_Temperature;
Begin
     If (Temp > Const4) and (Temp < Const3) Then
     Up_Temperature;
     If (Temp >= Const3) and (Temp <= Const2) Then
     Same_Temperature;
     If (Temp > Const2) and (Temp < Const1)Then
     Down_Temperature;
     .
End.
```

In this simple example, the BASIC routine of TABLE 1 is a routine which monitors an industrial process including an oven temperature. The PASCAL routine of TABLE 2 is a routine, which may even be running on a different computer, which actually controls the industrial process including controlling the oven temperature. The PASCAL routine uses 4 constants representing limits on the oven temperature. This program's job is to maintain the temperature between temperatures Const1 and Const4, such range being acceptable for the process. In this case, the ideal temperature range is between the values of constants Const2 and Const3. If the temperature drops between temperatures Const3 and Const4, the program increases the oven temperature. If the temperature drops to between the temperatures Const1 and Const2, the program decreases the oven temperature. The monitoring program of TABLE 1 periodically checks the temperature of the oven and informs the operator that products have been damaged by excessive temperature if the temperature of the oven exceeds CONST1. The operator must then reinitialize the product process if the maximum temperature is exceeded.

Note that the monitoring program of TABLE 1 erroneously indicates that the value of CONST1 is 657 rather than the correct value of 675. This is an error which could easily occur by simply transposing the last two digits of the value of CONST1 or by other human error or modification of the source file. The probability of such an error in consistency, of course, increases with the number of constants which must be shared between the two routines. In this simple example, the error could go completely undetected for a long period of time as long as the oven does not approach the upper end of the ideal range. During this time, however, large numbers of products processed at the upper end of an ideal range might be reported damaged by excessive temperatures when in fact they are not. This could result in excessive scrap in the process as well as loss of production time due to unnecessary reinitialization of the process. Since the system might appear to work correctly for a large portion of the time, the error may be extremely difficult and expensive to find and is likely to be attributed to hardware malfunction.

Of course in this simple example, the error would likely be noticed in testing the software. But even so, such errors are often difficult to find and can produce substantial development delays. This is especially the case when there are thousands of compile time constants which are shared. This is frequently the case in large software system development programs which use numerous software engineers any of whom may erroneously change a constant or fall to uniformity change a constant. Such seemingly minor errors can become disastrous in such circumstances. Clearly, what would be desirable is the ability to define a value for CONST1 in a single, central place, and pass this definition down to every source file that uses this parameter, even though such files might be written in different languages.

The present invention provides a mechanism for solving this problem at the expense of an additional preprocessing step in the development process. This invention provides a mechanism whereby it is possible to make a single definition for a global compile time parameter available to source files in many different languages. This provides a great advantage in software maintenance, to wit, that when the parameter is required to be changed, it is necessary to change its value only in one place, and the change would then be propagated down to all the files using the parameter, even if they are not all in the same source language. The mechanism described herein uses a known technique called "preprocessing", and extends its use into the area of the integration of multi-language software systems.

Although preprocessing is a known technique and in fact is provided for as a part of the "C" programming language, it has not been known to be applied to the area of multi-language software systems before. By using the same preprocessor on source files in multiple languages to pull in global parameter definitions from a common set of header files, integrity can be assured in the generation of software system products.

SUMMARY OF THE INVENTION

It is an object of the present invention to provide an improved method of processing software in multiple languages.

It is another object of the present invention to provide an improved method of assuring consistency of global constants in a system using multiple software languages.

It is a further object of the present invention to provide a mechanism for assuring consistency of global constants in a multilanguage software environment when updates are made to the software and constant definitions.

These and other objects of the invention will become apparent to those skilled in the art upon consideration of the following description of the invention.

In one embodiment of the present invention a method of assuring consistency of constants in a multilanguage software system, includes generating a first set of code written in a first language using a plurality of symbolic constants to represent a corresponding plurality of actual constants. A second set of code is written in a second language using the same plurality of symbolic constants to represent the corresponding plurality of same actual constants. A common header file is generated which contains information which relates to plurality of symbolic constants to the corresponding plurality of actual constants. The header is included within the first and second sets of code. The symbolic constants in the first and second sets of code are replaced with their corresponding actual constants during a preprocessing step. Any constructs which are not a part of the first language are stripped from the second set of code including the header. Any constructs which are not a part of the second language are stripped from the first set of code including the header. The resulting files have their symbolic constants consistently replaced by constants which are defined in the header so that changes need only be made in the header to assure consistency in the several languages.

The features of the invention believed to be novel are set forth with particularly in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
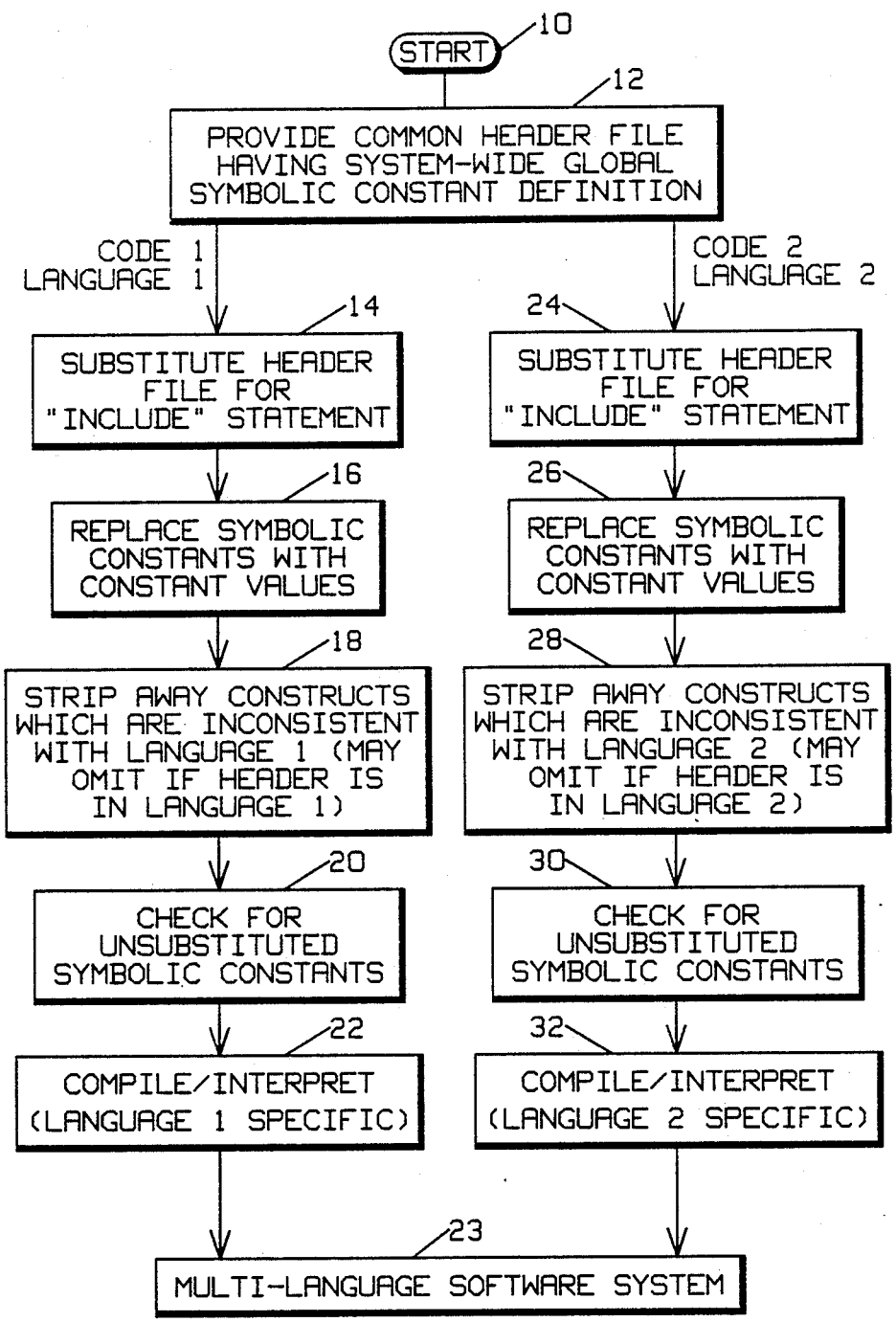
FIG. 1 is a flow chart of the operation of the preprocessor of the present invention.

The present invention will be described in terms of a preferred implementation relating to development of a large system utilized for control, management and diagnostics of a large computer network which may communicate with as many as 10,000 or more devices such as modems, multiplexers, digital service units, etc. Hereinafter, this system will be referred to as the Network Management System or NMS for short. The Network Management System is generated from many different source files, the main ones being written in the C programming language (the "native" language in which the system is written) and UFI (a vendor-supplied language available from Oracle, for interfacing with the Oracle dedicated Relational Database Management System used by the NMS.) The UFI processor is actually an interpreter for the almost universally known Structured Query Language (SQL). In this instance, source files in these two different languages are integrated using the preprocessing mechanism of the present invention, such that both could access system wide global compile time parameters defined in a single, central location.

There is a need for a standard mechanism of accessing Database Tables in the NMS. This pertains not necessarily to the information contained in the table, but rather to information about the table itself. This is information such as the size of fields in the table and what allowable values (if restricted) may be contained therein. A familiar example of this need is the definition of field sizes for ASCII fields that are retrieved from the database and copied into the application code. These field sizes are required by the application code that does the retrieval in order to know how much storage to allocate. Without the multilanguage system integration of the present invention, such field sizes might be defined as preprocessor equates in various scattered header files. As such, there is nothing to guarantee that, should the field size definition change in the database table, that the application code would also automatically change the amount of storage allocated, and universally do so in all application files.

Due to the ability of the NMS to perform diagnostics monitoring and testing a large variety of different devices, the NMS utilizes a database of information about each possible device. In addition to other run time constants, the database must include at least one row of information about each possible physical device that could be connected to the network. For example, each model of modem which is usable in the network must contain entries relating to the type of modem, its communication speed, tests which may be performed on the modem under control of the NMS, as well as other characteristics of the modem. In addition, if other files require access to the database, other constants relating to the size of each of the fields in the database must be initialized in all of the languages so that the database or information retrieved from the database is accessible to all source files. The result is an extremely large quantity of constants which must be available to each source file at compile time in order to be able to effectively communicate.

From a software engineering viewpoint, a database table must also be viewed as another resource available to components of a large software system. The NMS processes use many such resources: services provided by manager processes, services provided by custom NMS library functions, and services provided by standard C libary functions. Correct usage of these services requires correct interpretation of the symbolic constants (or symbols) used in interfacing with the services providers. The mechanism for enforcing correct usage is to define the symbolic constants meaningful to the interfacing in a header file. This header file is then included (using an include statement) in both the code which creates the service provider as well as in the code which creates the application client task. In the event of a design change, by the merely changing the interfacing symbolic constants in the header file, we are guaranteed synchronism when a build is performed since the same header file is included by both processes.

An identical scheme may be applied to database tables, which can then be treated as standard resource components. Briefly, the scheme is implemented using the following process:

1. The introduction of a set of global header files. These global header files define symbolic constants required for interfacing with the database tables.
2. Modification of application code to use symbolic constants from the global header files instead of locally defined symbols.
3. Modification of database definition UFI scripts to use symbolic constants from the global header files instead of hard coded numbers.
4. The development of a "UFI Preprocessor" (more properly termed a "SQL Preprocessor") to resolve these symbolic constants into actual constants at build time and create "executable" UFI scripts.

The following sections explain by example how each of these are implemented.

DATABASE TABLES

As an example, consider a hypothetical database table TUNIT as shown in Table 3 which contains information about a given unit.

TABLE 3

| unit id | category | dom id | site id | status |
|---------|----------|--------|---------|--------|
| 102 | 2 | 199 | 299 | 1 |
| 104 | 8 | 199 | 299 | 0 |

Clearly, before this table is accessed, the application code would find the following pieces of information useful:

What the size, in bytes, of each field is (so that sufficient storage may be allocated before the fields are read in)

For fields that have restricted values, what values or range of values are acceptable.

This information could, in fact, be provided to the client code in a header file. Such a header file is described in the following section.

GLOBAL HEADER FILES

The database table header file provides the application code the information described in the above section, that it would need. In the above example, while the internal domain id (domid) site id (siteid) and unit id (unitid) may have any value, the category must belong to a finite set of enumerable values. Prior to the implementation of the present invention preprocessor, the set of acceptable values for the "category" field might be locally defined. This is obviously not desirable since these local definitions may not be available to all source files. Moreover, the status field can only have values from the set {1,0}, meaning active or inactive. These values might similarly be defined, if at all, in an ad hoc manner in various scattered local header files.

TABLE 4 is an example of the global header file "TBtunit.h", which might be used with the above table.

TABLE 4

```
/*
*****************************************************
* FILE: TBtunit.h
*
* DESCRIPTION: Global header file for Database Table TUNIT.
* See manual page for table TUNIT
*
* AUTHOR: John Q. Developer
*
* MODIFICATIONS: 1/1/87 Original Coding JQD
```

TABLE 4-continued

```
*
****************************************************
*/
/*
* Field size definitions
*/
#define TBN__UNITID 6 /* Size of "unitid" field*/
#define TBN__CATEGORY 2 /* Size of "cateory" field */
#define TBN__DOMID 6 /* Size of "domid" field*/
#define TBN__SITEID 6 /* Size of "siteid" field*/
#define TBN__STATUS 1 /* Size of "status" field*/
/*
*Field value definitions for the "CATEGORY" field
*/
#define TBV__DMODEM 1 /* Diagnostic modem device */
#define TBV__DMUX 2 /* Diagnostic mux device */
#define TBV__DRESTORAL 3 /* Diagnostic restoral device */
#define TBV__DOTHER 4 /* Other diagnostic device */
#define TBV__NCPU 5 /* Non-diagnostic CPU device */
#define TBV__NFEP 6 /* Non-diagnostic FEP device */
#define TBV__NMODEM 7 /* Non-diagnostic modem device */
#define TBV__NMUX 8 /* Non-diagnostic mux device */
#define TBV__NPRINTER 9 /* Non-diagnostic printer device */
#define TBV__NTERMINAL 10 /* Non-diagnostic terminal
device */
#define TBV__NOTHER 11 /* Other non-diagnostic device */
/*
* Field value definitions for the "STATUS" field
*/
#define TBV__STINACT 0 /* Inactive status */
#define TBV__STACT 1 /* Active status */
/*
* End of file TBtunit.h
*/
```

MODIFIED APPLICATION CODE

The application code should include the above header file for the table if it needs to use the table. The application code would use the symbols for size and value definitions available from the header file for running its application. An example application code is shown in TABLE 5.

TABLE 5

```
#include "TBtunit.h"
#define NROWS 10
myfunc( )
{
int i;
int category;
char *bufptr;
/*Allocate a buffer to read in the category field as an ASCII
string */
char category__field [TBN__CATEGORY + 1];
/* convert ASCII data to numeric */
/* Perform semantic validation on the numeric data */
/* The field value definitions are used here */
for (i=0; i<NROWS; i++)
    {
    get-data (cateory__field);
    category = atoi (category__field);
    if (category >= TBV__NCPU &&
    join category <= TBV__NOTHER)
        {
        display-error (. . . "not a diagnostic device" . . .);
        }
    else    if (status == TBV__STINACT)
        {
        diplay-error(. . . "unit inactive " . . .);
        }
    else
        {
        run application( );
        }
    }
}
```

By making extensive use of the various symbolic features provided in the TBtunit.h header file, the application code of Table 5 above can considerably simplify its mechanism for obtaining and processing table data. Because these mechanisms are available from every table's header file, they are standard, leading to better maintainability and efficiency.

UPS SCRIPT FILES

The greatest advantage in associating header files with database tables can be seen in the UFI scripts associated with the database table. Defining field size definitions symbolically, for example, allows the usage of these symbolic constants in the table creation scripts themselves. Note that UFI does not permit use of these symbolic constants or use of an "include" statement in UFI scripts.

The table in this example can be created by the following script of TABLE 6.

TABLE 6

```
/*
****************************************************
*
* FILE: tunit.ups
*
* DESCRIPTION: Table creation script for the TUNIT database
table.
*
****************************************************
*/
#include "TBtunit.h"
create table TUNIT
( /* Table creation script */
unitid number (TBN__UNITID) not null, /* unitid field */
category number (TBN__CATEGORY) not null, /* category
field */
domid number (TBN__DOMID), /* domain id field */
siteid number (TBN__SITEID), /* site id field */
status number (TBN__STATUS) /* status field */
)
space small;
/*
* End of file tunit.ups
*/
```

The advantages of having symbolic information in UFI script files, as above, are that hard coded numbers are avoided. By changing the definitions in the header file, we automatically change both the creation script and the application code. When inserting data into the table, or examining the values of retrieved data, both the application code and the UFI code could use the symbolic constant definitions available from the header file.

The UFI script above cannot be run as such through the UFI interpreter; it needs to be "preprocessed" to create an "executable" UFI script. Since the actual UFI scripts are derived through these source files, the convention for suffixing these source files will be ".ups" (for Ufi Preprocessor Source). The working of the UFI preprocessor is explained in the following section.

THE UFI PREPROCESSOR

In the above example, the minimal function of the UFI preprocessor is to process the ".ups" source file to resolve symbolic constants into actual constants and strip the C-style comments. As a more complete specification, the UFI preprocessor has the following capabilities:

(a) File inclusion, direct and nested
(b) File tree walk for include file search (c) Recognition of C-style defined symbolic information in header files
(d) Resolution of references to such symbolic information
(e) Conditional compilation (using #if, #ifdef etc)
(f) Macro expansion to in-line code
(g) Command-line input for symbolic control words for preprocessing
(h) Recognition of C-style syntax in the ".h" and ".ups" source which is not meaningful to UFI, and removal of such syntax. This may include (but is not limited to)
C-style comments
Structure and union template declarations
typedef declarations.

Another useful facet of the conditional compilation ability of the preprocessor of the present invention is illustrated in the following example. The problem arises in the initialization of permanent data in the database tables. Consider the table that contains the list of all unit types and along with its attributes. Because such data is permanent, it should be initialized into the system at generation time, that is, there should exist a data initialization script to insert this data into the table immediately after this table is created. Moreover, because the set of all unit types is a finitely enumerable set, this set of values is defined in the table's header file. For ease of decoding, this set of values has been defined as two-byte variable of which the upper byte defines the class of object and the lower byte the actual unit type within that class.

This is illustrated in the following section of the header file (TABLE 7):

TABLE 7

```
/* Defines for various object classes */
#define TBV_MODEM 1 /* Modem */
#define TBV_LMS 2 /* LMS unit */
.
.
.
/* Define macro to generate actual object types */
/* objclass in upper byte & objcode in lower byte */
#define TBmkobj(objclass,objcode)
((objclass) << 8 & (objcode))
/* Define actual object types */
#define TBV_O48 TBmkobj(TBV_MODEM,61) /* OMNI-
MODE 48 */
#define TBV_O48D TBmkobj(TBV_MODEM,62) /* OMNI-
MODE 48D */
.
.
.
/* Define macros for testing object classes in upper byte */
#define TBis_modem(X) ((((X>>8) & 0177)
== TBV_MODEM))
/* object is a diagnostic modem */
#define TBis_lms(X) ((X>>8) & 0177)) == TBV_LMS))
/* object is an LMS unit */
.
.
.
```

This works fine for C application code, because the TBmkobj macro expands into a C-understandable construct with bit shifts defined in C syntax. However, when it is time to initialize permanent data into the database table, the data initialization UPS script would contain statements such as:

```
insert into TUTYP
  (unitype, attribute1, attribute2 ... )
  values
  (TBV_O48D, TBV_val1, TBV_val2, ... );
```

This would not work, because when this file is run through the UFI preprocessor, the TBV$_{13}$O48D value, which is defined in terms of a macro, would expand to a C-understandable construct which would be meaningless in the UFI data initialization script and cause a syntax error.

This is where the conditional compilation aspect of the preprocessor is useful. Note that UFI has the ability to recognize arithmetic expressions in data initialization, (eg "insert into table (col) value (2+1);") and also provides certain built-in arithmetic functions. Therefore, the preprocessor can be used to conditionally expand the macro to a UFI-understandable construct if it is actually being used for table generation; otherwise, if it is used by application code, it expands into a C-understandable construct.

This is demonstrated by the section of a header shown in TABLE 8:

TABLE 8

```
#define TBBITSHIFT 8 /* shift bit 8 places to move to upper
byte */
#ifdef TBTABLEGEN /* If used in actual generation of tables,
expand macro to generate a UFI Understandable construct */
#define TBmkobj(objclass,objcode)
((objclass) * power(2,TBBITSHIFT) + (objcode))
#else /* if used by application C code, expand macro to generate
the equivalent C-understandable construct */
#define TBmkobj(objclass,objcode)
((objclass) << TBBITSHIFT & (objcode))
#endif
```

Thus, when the header file is used in the actual generation of the table, the UFI preprocessor defines -DTBTABLEGEN on the command line. This causes the instance of the macro used in the data initialization script to expand into something like:

```
insert into TUTYP
  (unitype, attribute1, attribute2 ... )
  values
  (((1) * power(2,8) + (62)), val1, val2, ... );
``` which is perfectly understandable by UFI. Because both macro expansions evaluate to the same numeric value, when this value is read in by the application code from the database into an unsigned variable and bit operations are performed on it, the application code will work correctly.

In general, when preprocessing is used for the expansion of macros with arguments into language-specific expressions involving those arguments, this technique can still be used by conditionally expanding the macro into different but equivalent language-specific expressions, depending on which source file is currently being preprocessed.

Turning now to FIG. 1, a flow chart of the preprocessing process of the present invention starts at 10 with 2 (or more) sets of code labeled code 1 and code 2 which are written in language 1 and language 2 respectively. At step 12, a common header file is also created. This common header file includes definitions for all global symbolic constants. That is, the header file includes the relationship between symbolic constants and their associated actual constants. This header file is a file which may be manually created and maintained as the single file containing all constant definitions.

To preprocess code 1 written in language 1, control passes to step 14. As part of the code 1 file, a standard include statement is placed near the beginning of the file. In the case of a C language file, the include statement is a standard C include statement which references the file containing the header. At step 14, the header file is physically substituted in place of the include statement as an automatic part of the preprocessor operation. This step is standard to the preprocessing which occurs as part of the C language compilation process. Control then passes to step 16 where all symbolic constants are replaced with the actual constant values and macros are expanded as an automatic part of the preprocessing process. This step is also frequently a part of the C compilation process. Control then passes to 18 where any constructs which are inconsistent with language 1 are automatically stripped out of the code 1 file by the preprocessor. In the case where the header file is written in code 1, this step may be omitted since the header may also be utilized as a common location for other language 1 constructs. Control then passes to step 20 where the preprocessed code 1 is inspected by the preprocessor to determine that there are no symbolic constants which have not been substituted for. (In the C language, this is automatically performed by the compiler and the link-editor, so this step could be optionally omitted.) This may be accomplished by establishing a naming convention for all variables, constants, subroutines etc. Thus, if all symbolic constants take on the form of CONSTxxxx where xxxx represents a number assigned to the constant, step 20 may be accomplished by searching the file for words which start with CONST followed by numbers. Other conventions may be even more suitable. If unresolved symbolic constants remain, a warning may be issued (e.g. print an error message with location of the possible error for manual correction). Control then passes to step 22 where the code 1 is compiled or interpreted causing a compiler or interpreter which is specific to language 1.

In the case of code 2 which is generated in language 2, control passes from 12 to step 24 where once again the header file is physically substituted for an include statement. Control then passes to 26 where once again all symbolic constants are replaced with the actual constant values and macros are expanded. Control then passes to 28 where any constructs which are inconsistent with language 2 are stripped from code 2. As in step 18, if the header is written in language 2, the step may be omitted. Control then passes to step 30 where a check for unsubstituted symbolic constants is performed. Control then passes to step 32 where a language specific compiler or interpreter is invoked to produce executable code. The compiler interpreted outputs of steps 20 and 30 are joined at step 23 to produce a single multilanguage software system which is assured of consistent constant definitions. In the attached appendix, the actual code utilized to implement the above preprocessor using the standard C preprocessor function and UNIX TM shell script is shown. This code was developed to run on the Gould Powermode TM 9082 computer under the Gould UTX/32 Version 2.0 Operating System (a variation of UNIX TM).

In the above process, steps 14 and 16 for code 1 and steps 24 and 26 for code 2 correspond to the first pass of the preprocessor. Steps 18 and 28 correspond to the second pass of the preprocessor. Steps 29 and 30 correspond to the third pass of the preprocessor.

Although this scheme introduces an additional level of processing—it requires running all UPS scripts through the UFI preprocessor—this level is introduced only at build time, where time and resource usage are not critical. Moreover, the gains achieved in software maintainability are so large that this is expense is thought to be well worth it.

Those skilled in the art will appreciate that various modifications may be made to the example implementation of the present invention without departing from the invention. For example, the C preprocessor may be used with a C-language header, for source files in two or more completely different languages. Compliers and interpreters may be freely interchanged. There may be any number of languages utilized, and so forth.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

---

APPENDIX I

```
##########################################

#     Copyright © 1987, 1988, by Racal-Milgo
All Rights Reserved
Confidential and Unpublished Work
Property of Racal-Milgo

##########################################

#The following definitions are set up for the first, second
#and third passes of the UFI preprocessor.
UFIP1 = "cc -E -DTBTABLEGEN"
UFIP2 = "pass2.ufipp"
UFIP3 = "pass3.ufipp"
export UFIP1 UFIP2 UFIP3
```

---

APPENDIX II

```
##########################################

#     Copyright © 1987, 1988, by Racal-Milgo
All Rights Reserved
Confidential and Unpublished Work
Property of Racal-Milgo

##########################################

#The following commands invoke the preprocessor on
#an example file.

$UFIP1 Example.UPS | $UFIP2 > Example.UFI;
$UFIP3 Example.UFI
```

APPENDIX III

```
###########################################

Copyright © 1987, 1988, by Racal-Milgo
All Rights Reserved
Confidential and Unpublished Work
Property of Racal-Milgo

###########################################

#The following SED program invokes the second pass
#of the preprocessor.
#This program could be optionally rewritten in awk, lex, yacc, or any
#number of other languages
sed "
        /  #/d
        /static/d
        /extern/d
        s  "  '/g
        /struct/,/  [ ]*}/d
        /union/,/   [ ]*}/d
        /typedef/d
        /  $/d
        /  L/d
        /  [ ]*$/d
    "    > /tmp/tblmake.ufi
CMD=
        egrep —in "insert|create|alter|update|delete|drop|select" /tmp/tblmake.
ufi |
        sed lq |
        awk '{
            split($O,a,":");
            if (a[1] <=1) print "cat"
            else if (a[1] ==2) print "sed ld"
            else printf "sed 1,%dd",a[1]-1
        }'

$CMD /tmp/tblmake.ufi
rm —f /tmp/tblmake.ufi
```

APPENDIX IV

```
###########################################

Copyright © 1987, 1988, by Racal-Milgo
All Rights Reserved
Confidential and Unpublished Work
Property of Racal-Milgo

###########################################

#The following code implements the third pass of the
#preprocessor, for a naming convention that begins all symbolic
definition
#tokens with the prefix TB.

UNDEF_SYM=  egrep —n '[  A-Z]TB' $1
if test —n "$UNDEF_SYM"
then
        echo "******* Warning: Possibly undefined symbols in file
        $1"
        echo $UNDEF_SYM
        exit 1
else
        exit 0
fi
```

I claim as my invention:

1. A method of assuring consistency of constants in a multilanguage software system, comprising the steps performed by a computer of:
providing a first set of code written in a first language using a plurality of symbolic constants to represent a corresponding plurality of actual constants;
providing a second set of code written in a second language using said plurality of symbolic constants to represent said corresponding plurality of actual constants;
providing a header which contains information which relates said plurality of symbolic constants to said corresponding plurality of actual constants;
including said header within said first and second sets of code;
preprocessing said first and second sets of cody by:
replacing said symbolic constants in said first and second sets of code with their corresponding actual constants; and
stripping any constructs which are not a part of said first language from said second set of code including said header.

2. The method of claim 1, further comprising the step of stripping any constructs which are not a part of said second language from said first set of code including said header.

3. The method of claim 1, further comprising the step of compiling or interpreting said first code with a compiler or interpreter specific to said first language.

4. The method of claim 1, further comprising the step of compiling or interpreting said second code with a compiler or interpreter specific to said second language.

5. The method of claim 1, wherein said including step comprises:
including said header within said first and second sets of code by referencing said header in a statement; and
substituting said header for said statement.

6. The method of claim 2, further comprising the step of compiling said first code with a compiler specific to said first language and interpreting said second code with an interpreter specific to said second language.

7. The method of claim 6, wherein said first language is C programming language and wherein said second language is Structured Queiry Language (SQL).

8. The method of claim 6, wherein said header is written in C programming language.

9. The method of claim 1, wherein said replacing step is carried out by use of a C language preprocessor.

10. The method of claim 1 further comprising the steps of providing symbolic macros within said header and expanding said symbolic macros into language 1 specific statements in code 1 and language 2 specific statements in code 2.

11. A method of assuring consistency of constants in a multilanguage software system, comprising the steps performed by a computer of:
  providing a first set of code written in a first language using a plurality of symbolic constants to represent a corresponding plurality of actual constants;
  providing a second set of code written in a second language using said plurality of symbolic constants to represent said corresponding plurality of actual constants;
  providing a header which contains information which relates said plurality of symbolic constants to said corresponding plurality of actual constants;
  including said header within said first and second sets of code by referencing said header in a statement;
  substituting said header for said statement;
  preprocessing said first and second sets of code by:
    replacing said symbolic constants in said first and second sets of code with their corresponding actual constants;
    stripping any constructs which are not a part of said first language from said second set of code including said header;
    stripping any constructs which are not a part of said second language from said first set of code including said header;
    compiling or interpreting said first code with compiler or interpreter specific to said first language; and,
    compiling or interpreting said second code with a compiler or interpreter specific to said second language.

* * * * *